(12) United States Patent
Loveday et al.

(10) Patent No.: US 8,589,213 B2
(45) Date of Patent: Nov. 19, 2013

(54) COMPUTER METRICS SYSTEM AND PROCESS FOR IMPLEMENTING SAME

(75) Inventors: Darren P. Loveday, Waterlooville (GB); Hitendrakumar Sanghavi, Nutley, NJ (US); Philip C. Manning, Weehawken, NJ (US); Paul Dodd, Vancouver (CA); Martin Hayes, New York, NY (US)

(73) Assignee: HSBC Technology & Services (USA) Inc., Mettawa, IL (US)

( * ) Notice: Subject to any disclaimer, the term of this patent is extended or adjusted under 35 U.S.C. 154(b) by 0 days.

(21) Appl. No.: 13/276,956

(22) Filed: Oct. 19, 2011

(65) Prior Publication Data

US 2012/0215585 A1 Aug. 23, 2012

Related U.S. Application Data

(60) Provisional application No. 61/405,398, filed on Oct. 21, 2010, provisional application No. 61/407,210, filed on Oct. 27, 2010, provisional application No. 61/435,000, filed on Jan. 21, 2011.

(51) Int. Cl.
*G06Q 10/00* (2012.01)

(52) U.S. Cl.
USPC ........................................ 705/7.38

(58) Field of Classification Search
USPC .............................. 705/7.29, 7.38
See application file for complete search history.

(56) References Cited

U.S. PATENT DOCUMENTS

| | | | |
|---|---|---|---|
| 5,866,889 A | 2/1999 | Weiss | |
| 6,021,397 A | 2/2000 | Jones | |
| 6,131,810 A | 10/2000 | Weiss | |
| 6,199,077 B1 | 3/2001 | Inala | |
| 6,278,993 B1 | 8/2001 | Kumar | |
| 6,292,789 B1 | 9/2001 | Schutzer | |
| 6,354,490 B1 | 3/2002 | Weiss | |
| 6,412,073 B1 | 6/2002 | Rangan | |
| 6,567,850 B1 | 5/2003 | Freishtat et al. | |
| 6,594,766 B2 | 7/2003 | Rangan | |
| 6,633,910 B1 | 10/2003 | Rajan | |
| 6,725,425 B1 | 4/2004 | Rajan | |
| 6,802,042 B2 | 10/2004 | Rangan | |
| 6,859,212 B2 | 2/2005 | Kumar | |
| 6,865,680 B1 | 3/2005 | Wu | |
| 6,867,789 B1 | 3/2005 | Allen | |
| 6,871,220 B1 | 3/2005 | Rajan | |
| 6,871,346 B1 | 3/2005 | Kumbalimutt | |
| 6,886,025 B1 | 4/2005 | Britton | |

(Continued)

OTHER PUBLICATIONS

International Search Report and Written Opinion from International application No. PCT/US11/58014, issued Feb. 27, 2012.

(Continued)

*Primary Examiner* — Romain Jeanty
(74) *Attorney, Agent, or Firm* — Stroock & Stroock & Lavan LLP

(57) ABSTRACT

A metrics computer system is configured to collect and analyze metrics from a plurality of account opening data sources including at least one component of an account opening system and a local entity storing account opening data. The metrics computer system includes a data acquisition layer, a data processing layer, and/or an information delivery layer. Various embodiments are described, including a computer implemented method for collecting and analyzing metrics using a metrics component and/or module.

29 Claims, 16 Drawing Sheets

(56) References Cited

U.S. PATENT DOCUMENTS

| | | |
|---|---|---|
| 7,013,310 B2 | 3/2006 | Messing |
| 7,085,997 B1 | 8/2006 | Wu |
| 7,178,096 B2 | 2/2007 | Rangan |
| 7,200,804 B1 | 4/2007 | Khavari |
| 7,203,845 B2 | 4/2007 | Sokolic |
| 7,225,464 B2 | 5/2007 | Satyavolu |
| 7,313,813 B2 | 12/2007 | Rangan |
| 7,321,874 B2 | 1/2008 | Dilip |
| 7,321,875 B2 | 1/2008 | Dilip |
| 7,383,223 B1 | 6/2008 | Dilip |
| 7,424,520 B2 | 9/2008 | Daswani |
| 7,505,937 B2 | 3/2009 | Dilip |
| 7,536,340 B2 | 5/2009 | Dheer |
| 7,571,140 B2 | 8/2009 | Weichert |
| 7,577,598 B2 | 8/2009 | Rousseau |
| 7,606,752 B2 | 10/2009 | Hazlehurst |
| 7,644,023 B2 | 1/2010 | Kumar |
| 7,657,761 B2 | 2/2010 | Sokolic |
| 7,672,879 B1 | 3/2010 | Kumar |
| 7,676,751 B2 | 3/2010 | Allen |
| 7,685,525 B2 | 3/2010 | Kumar |
| 7,729,283 B2 | 6/2010 | Ferguson |
| 7,734,541 B2 | 6/2010 | Kumar |
| 7,797,207 B1 | 9/2010 | Dilip |
| 7,856,386 B2 | 12/2010 | Hazlehurst |
| 7,856,453 B2 | 12/2010 | Malik |
| 7,873,677 B2 | 1/2011 | Messing |
| 7,925,579 B1 | 4/2011 | Flaxman |
| 7,933,819 B2 | 4/2011 | Dumas |
| 2001/0042785 A1 | 11/2001 | Walker |
| 2002/0091635 A1 | 7/2002 | Dilip |
| 2002/0156720 A1 | 10/2002 | Chow |
| 2002/0165745 A1 | 11/2002 | Greene |
| 2002/0165993 A1 | 11/2002 | Kramer |
| 2003/0069780 A1* | 4/2003 | Hailwood et al. ............... 705/10 |
| 2003/0101131 A1 | 5/2003 | Warren |
| 2003/0135457 A1 | 7/2003 | Stewart |
| 2003/0158928 A1 | 8/2003 | Knox |
| 2003/0208526 A1 | 11/2003 | Imanishi |
| 2003/0225692 A1 | 12/2003 | Bosch |
| 2003/0236728 A1 | 12/2003 | Sunderji |
| 2004/0015818 A1 | 1/2004 | McDonald et al. |
| 2004/0019853 A1 | 1/2004 | Takizawa et al. |
| 2004/0205414 A1 | 10/2004 | Roselli et al. |
| 2004/0230516 A1 | 11/2004 | Crosthwaite |
| 2005/0018249 A1 | 1/2005 | Miura |
| 2005/0125442 A1 | 6/2005 | Oxman |
| 2005/0144101 A1 | 6/2005 | Khandros |
| 2005/0171833 A1* | 8/2005 | Jost et al. ............... 705/10 |
| 2005/0187809 A1* | 8/2005 | Falkenhainer ............... 705/9 |
| 2005/0246269 A1 | 11/2005 | Smith |
| 2005/0262453 A1 | 11/2005 | Massasso |
| 2006/0036954 A1 | 2/2006 | Satyadas |
| 2006/0075334 A1 | 4/2006 | Sato |
| 2006/0116949 A1 | 6/2006 | Wehunt |
| 2006/0143107 A1 | 6/2006 | Dumas |
| 2006/0195816 A1 | 8/2006 | Grandcolas |
| 2006/0230343 A1 | 10/2006 | Armandpour |
| 2006/0253463 A1 | 11/2006 | Wu |
| 2007/0022027 A1 | 1/2007 | Gupta |
| 2007/0061254 A1 | 3/2007 | Blunck |
| 2007/0067239 A1 | 3/2007 | Dheer |
| 2007/0089047 A1 | 4/2007 | Joshi |
| 2007/0130347 A1 | 6/2007 | Rangan |
| 2007/0180380 A1 | 8/2007 | Khavari |
| 2007/0244816 A1 | 10/2007 | Patni |
| 2007/0282627 A1 | 12/2007 | Greenstein et al. |
| 2008/0080017 A1 | 4/2008 | Ishizuka |
| 2008/0082454 A1 | 4/2008 | Dilip |
| 2008/0086403 A1 | 4/2008 | Dilip |
| 2008/0086426 A1 | 4/2008 | Dilip |
| 2008/0091591 A1 | 4/2008 | Egnatios |
| 2008/0091593 A1 | 4/2008 | Egnatios |
| 2008/0091600 A1 | 4/2008 | Egnatios |
| 2008/0098030 A1 | 4/2008 | Edd et al. |
| 2008/0177848 A1 | 7/2008 | Wakhlu |
| 2008/0189185 A1 | 8/2008 | Matsuo |
| 2008/0208737 A1 | 8/2008 | Dilip |
| 2008/0262901 A1* | 10/2008 | Banga et al. ............... 705/10 |
| 2008/0275816 A1 | 11/2008 | Hazlehurst |
| 2008/0288376 A1 | 11/2008 | Panthaki |
| 2008/0288400 A1 | 11/2008 | Panthaki |
| 2008/0288861 A1 | 11/2008 | Jones |
| 2008/0301023 A1 | 12/2008 | Patel |
| 2008/0306846 A1 | 12/2008 | Ferguson |
| 2009/0006582 A1 | 1/2009 | Daswani |
| 2009/0024505 A1 | 1/2009 | Patel |
| 2009/0030771 A1* | 1/2009 | Eder ............... 705/10 |
| 2009/0048999 A1 | 2/2009 | Gupta |
| 2009/0112753 A1 | 4/2009 | Gupta |
| 2009/0234466 A1 | 9/2009 | Kunze |
| 2009/0276359 A1 | 11/2009 | Panthaki |
| 2010/0030687 A1 | 2/2010 | Panthaki |
| 2010/0063896 A1 | 3/2010 | Rose |
| 2010/0094878 A1 | 4/2010 | Soroca |
| 2010/0121677 A1 | 5/2010 | An |
| 2010/0205065 A1 | 8/2010 | Kumar |
| 2010/0205079 A1 | 8/2010 | Ferguson |
| 2010/0217662 A1 | 8/2010 | Ramer |
| 2010/0293447 A1 | 11/2010 | Kadowaki |
| 2010/0299286 A1 | 11/2010 | Dilip |
| 2011/0029491 A1 | 2/2011 | Joshi |

OTHER PUBLICATIONS

International Search Report and Written Opinion from International application No. PCT/US11/55767, issued Mar. 7, 2012.

International Search Report and Written Opinion from International application No. PCT/US11/056839, issued Mar. 8, 2012.

International Search Report and Written Opinion from International application No. PCT/US11/37143, issued Sep. 21, 2011.

International Search Report and Written Opinion from International application No. PCT/US12/22022, issued May 8, 2012.

International Preliminary Report on Patentability from International application No. PCT/US11/55767, issued Oct. 18, 2012.

* cited by examiner

COMPUTER METRICS SYSTEM AND PROCESS FOR IMPLEMENTING SAME

RELATED APPLICATIONS

This application claims the benefit of, and priority to, the following applications: U.S. Provisional Application No. 61/405,398, filed Oct. 21, 2010, entitled "Account Opening Metrics"; U.S. Provisional Application No. 61/407,210, filed Oct. 27, 2010, entitled "Integrated Customer Communications Module (ICCM)"; and U.S. Provisional Application No. 61/435,000, filed Jan. 21, 2011, entitled "Account Opening Flow Configuration: Navigation Interceptor and Portlet Wiring." This application is related to International Application No. PCT/US2011/055767, filed Oct. 11, 2011, entitled "Computer Architecture and Process for Application Processing Engine," and International Application No. PCT/US2011/037143, filed May 19, 2011, entitled "Account Opening Computer System Architecture and Process for Implementing Same." All of the above applications are incorporated herein by reference in its entirety.

BACKGROUND

Emerging systems and methods lack straight through computer processing for a variety of technological and/or computer driven processes to support both flexibility and global consistency, to standardize processes for an enhanced customer experience, and to reduce the need for IT support and other development resources. We have determined, however, that an organization's global footprint, economies of scale, and local expertise can all be leveraged for the benefit of computer service and/or resource users globally.

We have determined that a holistic view of the effectiveness of an overall computer system and process can allow the business/entity to use flexibility built into the account opening framework to make continuous improvements, and "champion/challenge" business processes to drive increased return for the business. We have developed a computer systems and computer implemented methods for collecting, reporting, and utilizing metrics.

SUMMARY

The present invention provides, in alternative embodiments, computer systems and computer implemented methods for collecting, reporting, and utilizing metrics for computer systems and methods. The systems and methods form a comprehensive metrics environment, tracking a variety of metrics regarding human interaction The data collected may provide a business/entity with insight into a number of areas such as consumer behavior and program effectiveness, and may provide an empirical measurement of activity.

A metrics collection and analysis computer system includes a plurality of account opening data sources including at least one component of an account opening system and a local entity storing account opening data, and a computer system configured for communication with the plurality of account opening data sources.

In some embodiments, the metrics computer system includes a data acquisition layer, acquiring the account opening data from said plurality of account opening data sources including the at least one component of the account opening system and the local entity at a first frequency, and transmitting the data at a second frequency.

In some embodiments, the metrics computer system includes a data processing layer receiving the data from said data acquisition layer, extracting amount values to at least one interface file, generating at least one table using input from the at least one interface file, and saving the at least one table in a database.

In some embodiments, the metrics computer system includes an information delivery layer generating and delivering a plurality of account opening reports representing the metrics collection and analysis.

In some embodiments, the data acquisition layer acquires the account opening data via group standard data feeds, and wherein said data processing layer generates the account opening reports responsive to the account opening data, providing a standard view of the account opening process, customer and staff interactions, and profitability of account opening processes globally.

In some embodiments, the data acquisition layer acquires the account opening data from the at least one component of an account opening system including logs of events and status changes acquired from at least one of an account opening front end, an application processing engine, a queue management system, a customer communications module, a funding system, and a product system.

In some embodiments, the data acquisition layer acquires front end logs of management information events and application data from each front end application. In some embodiments, the data acquisition layer acquires front end logs of exit and re-entry events for front end screens supporting local exit points from each front end application.

In some embodiments, the data acquisition layer acquires front end data used to identify which configuration options are offered to the user, application processing engine data used to identify the configuration options selected by the user, and wherein the front end data and the application processing engine data are available at an applicant level and a product level.

In some embodiments, the data acquisition layer acquires front end logs comprising at least one of a Configuration ID, a Process ID, a Flow ID, and a Tracking ID.

In some embodiments, the data acquisition layer acquires front end logs of events comprising at least one of: terms and conditions displayed to the user on a terms and conditions screen, user accepts or declines the terms and conditions on a terms and conditions decision screen and exits the terms and conditions decision screen, product offer displayed to the user on a product offer screen, and user accepts or declines the offer on an offer decision screen and exits the offer decision screen.

In some embodiments, the data acquisition layer acquires front end logs including time difference between rendering of a screen until the user selects to continue from the screen.

In some embodiments, the data acquisition layer acquires the account opening data from the local entity including at least one of media agency data, promotion data, and operating plan data.

In some embodiments, the data acquisition layer acquires the account opening data from the plurality of account opening data sources including at least one web analytics provider.

In some embodiments, the data acquisition layer acquires from the queue management system an extraction of data on the queues. In some embodiments, the data acquisition layer acquires from the application processing engine an extraction of data on at least one of applications, product applications, applicants funding, to-do's, and event-based transactions. In some embodiments, the data acquisition layer acquires from the customer communications module an extraction of communications data. In some embodiments, the data acquisition layer acquires from the product system comprising a cards system at least one of a credit card account balance, a Referrer ID, a Voucher code, and a Tracking ID. In some embodiments, the data acquisition layer acquires from the product system comprising a core banking system account details, including at least one of line of business, voucher code, and referrer details.

In some embodiments, the data acquisition layer transmits the account opening data to a data interface layer comprising at least one of a channel events interface, an accounts interface, a customer interface, a products interface, a transactions interface, and a staff data interface.

In some embodiments, the plurality of reports comprises at least one of a dashboard report, a daily report, a daily tracking report, a sales application funnel report, an application journey report, a media funnel report, a staff funnel report, a product application decisions:approval ratio report, a product applications age at status report, a configuration options report, and a communications efficiency report.

In some embodiments, the data acquisition layer acquires the account opening data responsive to a business process identifier tracked by the application processing engine and a flow identifier tracked by the account opening front end used to determine a sequence of processes for an end-to-end account opening journey.

In some embodiments, each account opening journey has a channel attribute having at least one variable, and when the at least one variable changes to a new variable the data acquisition layer is configured to acquire the logs of events and status changes responsive to the new variable, without IT intervention.

In some embodiments, a computer implemented method for collecting and analyzing metrics includes acquiring account opening data from a plurality of account opening data sources including at least one component of an account opening system and a local entity storing account opening data; extracting amount values from the account opening data to at least one interface file, generating at least one table using input from the at least one interface file, and saving the at least one table in a database; and generating and delivering a plurality of account opening reports representing the metrics collection and analysis responsive to said at least one table.

In some embodiments, the method includes acquiring the account opening data from the at least one component of an account opening system including logs of events and status changes acquired from at least one of an account opening front end, an application processing engine, a queue management system, a customer communications module, a funding system, and a product system.

In some embodiments, the method includes acquiring front end logs of management information events and application data from each front end application, wherein the front end logs comprise at least one of a Configuration ID, a Process ID, a Flow ID, and a Tracking ID.

In some embodiments, the method includes acquiring from the local entity at least one of media agency data, promotion data, and operating plan data.

In some embodiments, the method includes acquiring the account opening data from at least one web analytics provider.

In some embodiments, the method includes acquiring from the queue management system an extraction of data on the queues; acquiring from the application processing engine an extraction of data on at least one of applications, product applications, applicants funding, to-do's, and event-based transactions; acquiring from the customer communications module an extraction of communications data; acquiring from the customer communications module an extraction of communications data; and/or acquiring from the product system comprising a core banking system account details, including at least one of line of business, voucher code, and referrer details.

In some embodiments, each account opening journey has a channel attribute having at least one variable, and when the at least one variable changes to a new variable, the method includes acquiring the logs of events and status changes responsive to the new variable, without IT intervention.

In some embodiments, the method includes generating and delivering a plurality of reports comprising at least one of a dashboard report, a daily report, a daily tracking report, a sales application funnel report, an application journey report, a media funnel report, a staff funnel report, a product application decisions:approval ratio report, a product applications age at status report, a configuration options report, and a communications efficiency report.

DETAILED DESCRIPTION

To provide an overall view and understanding of the effectiveness of computer systems and processes, key metric data may be sourced from multiple computer system components to provide standardized reporting (e.g., as part of a software package). This may involve heavy usage of Business Intelligence (BI) systems, including data feeds to BI and web analytics (e.g., Webtrends®) capturing customer experience activities, as well as key information from the main components of the computer system and/or process.

Figure 1:
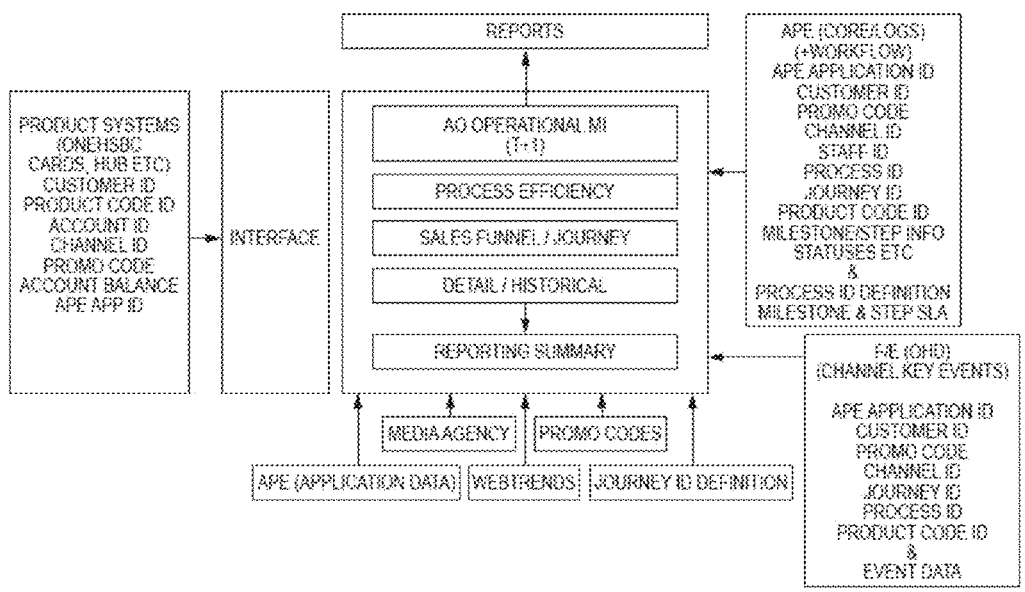
FIG. 1 is an exemplary diagram illustrating a metrics collection and analysis computer system according to some embodiments of the invention, with multiple account opening data sources providing data for reports.

As shown in FIG. 1, BI data may be gathered from a variety of sources, such as, but not limited to: Media Agencies (Display-count, Click-count, Cost-per-click, etc.); Webtrends® (e.g., Visitors/Visits on HSBC websites); Product Systems (e.g., Account Details like opening or current balance); Promotion Data (e.g., Campaign Details such as tracking ID, budget, etc.); Application Processing Engine (e.g., Application Details such as Type, Product, Customer, Staff, etc.; Application Events such as Milestone, Step, Status Changes, etc.; and Front-End Logs); Annual Operating Plan (e.g., Sales Targets by Month/Product); Queue Management System (QMS)/Workflow System (WFS) (e.g., Rate per hour, Outstanding and processed queue volumes); Integrated Customer Communications Module (ICCM) (e.g., Message types sent, Message volumes, Message channels).

Figure 2:
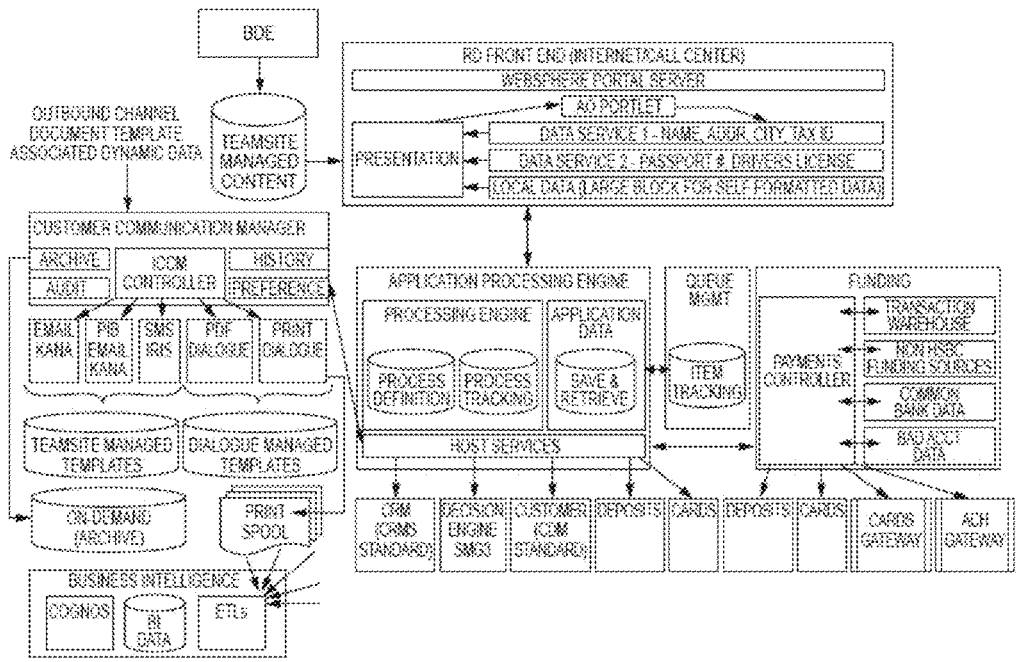
FIG. 2 is an exemplary diagram showing the metrics collection and analysis/business intelligence (BI) computer system in the context of an overall account opening system.

FIG. 2 is an exemplary diagram showing the BI computer system in the context of an overall account opening system. The BI system is configured to receive and process account opening data from any/all of the components of the account opening system, including those shown (the front end, the customer communication manager, the application processing engine, the queue management system, and the funding system). The account opening system may advantageously be used to support multiple customer segments as well as staff users, for example, Personal Financial Services (PFS) and Retail Commercial Business (CMB) Customers, New and Existing Customers, Staff Channel Users (e.g., branch or call center staff), Internet Channel Users, and ATM/Kiosk Channel Users, in addition to Management and Analytics (Metrics/Business Intelligence).

In some embodiments, an Account Opening (AO) system uses group standard data feeds, as well as the necessary reports to review this data, to provide a standard view of application processes, customer interactions, staff interactions and/or profitability with those processes, across the world.

In certain embodiments, BI may define data feeds specific for AO, as well as the necessary reports to review this data. One purpose for an AO-specific feed is to allow the AO metrics to be utilized by a site that does not yet have a full BI solution in place. Local entities may have varying data structures and Management Information (MI) solutions that would negatively impact the ability to easily plug in AO-related BI details.

In some embodiments, metrics capabilities such as those described herein can, for example, support the optimization of marketing, sales, process, and performance by capturing data at all points of an end to end journey, and providing a single version of truth for distribution metrics globally. Metrics can align to business transformation key performance indicators (KPIs) for benefit tracking.

In some embodiments, MI provides a business with a single version of truth through both a set of pre-developed out of the box core reports and the capability to access all logged data for ad-hoc data analysis. Core reports place the ability to drill through the data based on a range of dimensions directly in the hands of the business to understand performance based on combinations of customer type, channel and journey. Importantly, core reports have the flexibility to integrate new data values without IT involvement. In some embodiments, ad-hoc data analysis harnesses Cognos tooling to support core reports by empowering the business users with access to all data.

Data Logging provides the collection and cleansing of the management information from the other source components. Data logging can include both classic counts and also additional data required to provide a full end-to-end and multi-channel view of the customer experience, marketing activity and sales process. The data logging design preferably provides the flexibility to log new 'values' against existing 'attributes' to move with the configuration of other components with minimal IT involvement. For example, an additional value of ATM in the attribute of channel can be collected and cleansed seamlessly without IT intervention.

In some embodiments, an event emitter provides a consistent and configurable vehicle for capturing event data from various sources and 'sending' to various destination systems. This function is preferably business user managed through an appropriate GUI, enabling the business to actively manage what data gets logged to where and when.

Multiple journeys can be built side-by-side with variations such as test treatments, page layouts, branding, journey length or page navigation elements. Using different journey IDs, configuration IDs, content IDs or Common Processing Services (CPS) test treatment codes, variations in journeys can be tracked by Metrics in order to see what impact the variations had on end-to-end performance. Differences in journeys can be triggered by channel, product, proposition, country, and/or other attributes, and/or can be introduced randomly in order to perform an A/B test with all else equal. Advantageously, a journey can be changed responsive to information provided by the metrics data collected.

Advantageously, if the computer process for an account opening journey changes, IT is not needed to change the metrics. Metrics is configured to respond to different variables in the attributes. For example, for an account opening journey in the branch channel, there would be an attribute of 'channel,' with a variable of 'branch.' However, if the channel was changed to internet, then only the channel attribute would need to be changed to include the internet variable, and metrics would automatically be collected for the internet channel without the need for IT to do specialized programming. All processes and data-logging would recognize the new variable.

The area of MI is important to the business in helping to understand how the account opening process is working and, how, by changing parameters in the process, effects may be seen in sales conversions, application abandonments, etc. Audit and logging are related more to the historical data being captured in relation to product applications. Surveys cover how data is reviewed to see how the application process is working, be it customer questionnaires or reasons for application abandonment.

Preferably, in some embodiments, within a customer journey, MI data is logged and fed out of the account opening system, but the customer is not transferred out of the customer journey at any stage.

To allow complete flexibility of metrics analysis to the business, preferably all application-related data is extracted for MI purposes.

The business has the ability to define, run, and store queries over the data and extract the results into reports, so pre-defined reports do not necessarily need to be created.

In some embodiments, when a mini survey has been presented and the user has selected to proceed, application form data will be saved for Staff User retrieval. If a previous save exists, the save on mini survey will overwrite/append to the existing save. No validation will take place, there will be no request to set up credentials, and there will be no email sent to the customer. Surveys are presented based on entity specifications.

In some embodiments, there are two distinct areas to consider in terms of MI requirements for an account opening system, Non-Operational MI and Operational MI.

Non-Operational MI.

Exemplary functionality covered by Non-Operational MI includes Sales Journey Tracking, Process Tracking, and Customer-Level Tracking.

In some embodiments, a tracking ID provides the capability to generate and assign unique tracking/promo codes to various customer touch points and marketing efforts. The tracking ID is captured at the customer contact and retained throughout the subsequent journey to provide the business with visibility into the effectiveness of our marketing efforts and customer journeys. Tracking ID functionality preferably includes a full database build and business interface to generate and assign the unique tracking codes on an as needed basis, with no IT involvement.

Sales Journey Tracking.

This functionality covers the aggregating of anonymous data related to journey tracking and trending. At this level it is advantageously, in some embodiments, purely anonymous data relating to numbers passing through and is not necessarily at an individual customer level, while in other embodiments the data may optionally be at the customer level.

Preferably, data is collected that shows how sales journeys progress, where they stop, conversion rates, time on page, etc. This is often referred to as the "Sales Funnel", where there are various stages of a sales journey defined and where it is important to be able to track how many people are entering and exiting each stage of the process. Tracking and collecting this data enables the business to determine which customer journeys produce the best sales results, supporting the "test and learn" capabilities of the system.

By using tracking IDs, the business can also monitor marketing campaigns for effectiveness and return on investment. A tracking ID can be entered by both a customer and a customer service representative (CSR). For branch and call center channels, any MI/audit trail associated with a particular promotion/account opening preferably includes a record of the user's name (e.g., it is picked up automatically by the system).

In some embodiments, tracking IDs are historically linked with an application called Webtrends®, which can track information such as where customers are initially coming to the bank from (to determine how they arrived), average time spent on a page, pages where abandonments occur, number of visitors, journeys made, how many convert to sales, etc.—i.e., how people are using the system.

In some embodiments, the system provides a tagging capability for staff channels as well, to track how staff channel interactions are performing against the traditional sales funnel.

The business can view and interrogate this data in real-time, so that they can respond quickly and make changes, if they spot a potential problem area in a customer journey, allowing them to compare journeys against each other.

Data acquired can preferably break down the results by channel, product type, customer type and milestone or component level.

In some embodiments, any tracking ID type data that is captured (from any channel) as part of this process is passed through the entire account opening process and is ultimately passed to the back-end host systems to be stored against any new account that is opened to allow for the whole sales journey data to be tracked and be meaningful.

Figure 3:
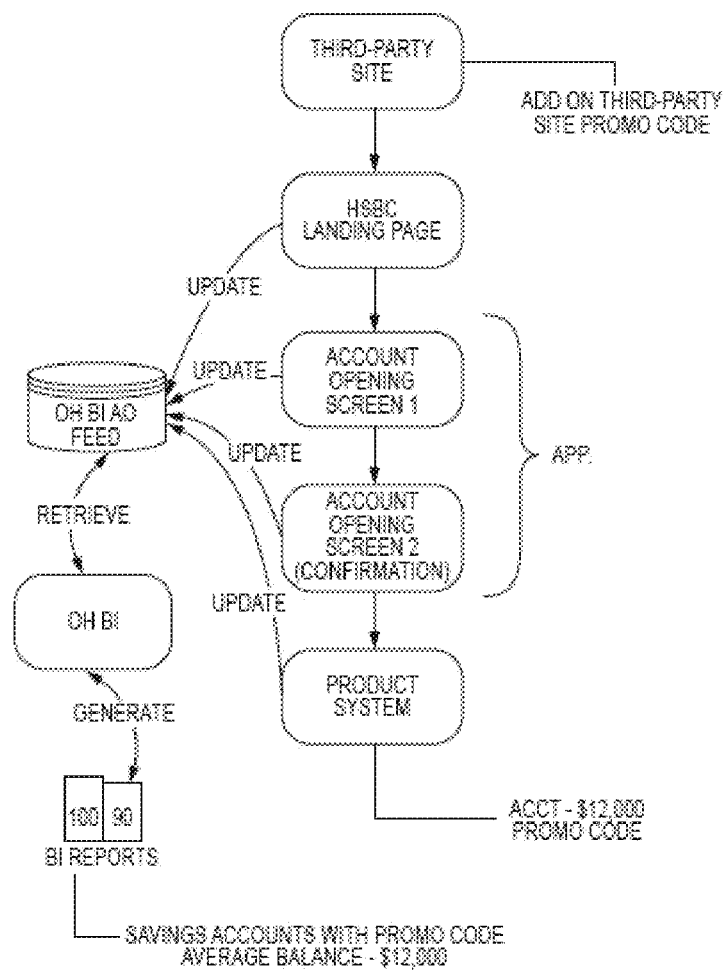
FIG. 3 is an exemplary flow diagram illustrating the use of tracking ID/promo codes in a BI system, according to some embodiments.
Figure 4:
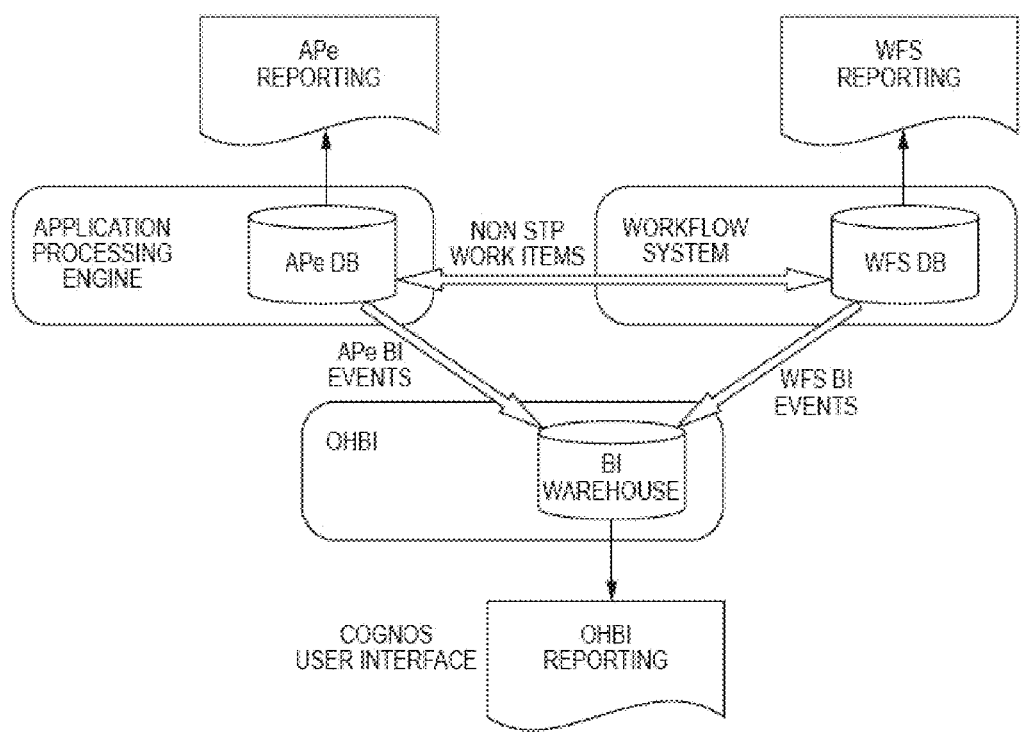
FIG. 4 shows an application processing engine (APe), a queue management system (QMS)/workflow system, and a BI system communicating and producing reports, according to some embodiments.
Figure 5:
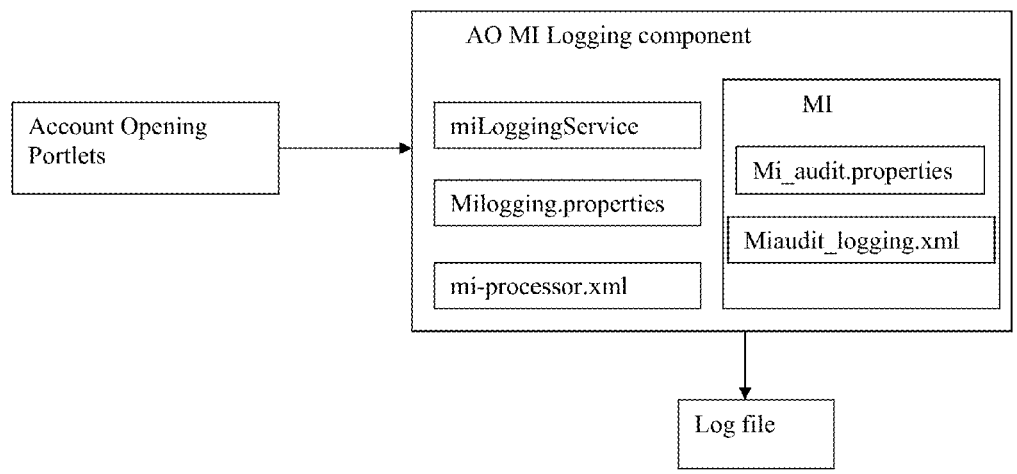
FIG. 5 is a diagram of a management information (MI) component of a front end architecture, according to some embodiments.

FIG. 3 is an exemplary flow diagram illustrating the use of a tracking ID in a BI system, according to some embodiments. A third party site tracking ID/promo code is tracked throughout the account opening process, and BI reports may be generated showing, for example, the number of savings accounts associated with the tracking ID and/or the average balance of the savings accounts associated with the tracking ID.

The tracking ID may also drive certain product features, prices or attributes, which may impact the behavior of the application (e.g., marketing campaigns may offer introductory pricing).

Information that may be important to the business may include, but is not limited to: volumes (hourly/daily/weekly/monthly/annually), page visits, landing page visits, originating pages (e.g., where navigated from), by product/product group, by channel, by currency, by customer type, length of time in the application, length of time on a page, etc.

The following are exemplary account opening metrics: Sales Journeys, Portlets Hit, Number of Applications pending/abandoned, Number of Accounts opened/activated, Amount of applications requiring referral (and reasons for referral), Conversion Rates, Error Rates.

The following are exemplary analytics functions that may, in some embodiments, require more in-depth analysis outside of the account opening arena: Response rates/success of marketing campaigns, Profitability of opened accounts, Customer acquisition costs, Cost per $000 acquired, Milestone specific data, Account opening processing time per account type.

Process Tracking.

This functionality covers the data relating to process management and improvement. This is data that can detail, for example, average time for a milestone component to complete, average time to move from one milestone component to another, time it takes for an application to complete end-to-end, where abandonments occur more frequently, etc.

This enables the business to employ the "test and learn" tactics to see what effect changing the process has on these types of statistics and to help spot potential problems areas that need addressing. For instance, if a particular milestone or component within a milestone always takes a long time to complete, the data could pinpoint this and the business could think of a different approach, deploy it, and compare if there is an improvement. If there were large number of abandonments at a particular part of the process, for example, this may indicate something wrong at that point, which may need addressing.

Customer-Level Tracking.

This functionality relates to the logging of key events that the customer undertakes during the account opening process.

In some embodiments, each time a customer completes a part of the process, this event is logged against their record so that the business can see how an application to open an account progressed at an individual customer level.

For example, Application Statuses that a customer journey passes through may be tracked and time-stamped when the changes in Application Status occur at the customer level.

Operational MI.

Exemplary areas covered by Operational MI are Operational Performance, Operational Management, Save and Retrieve, Audit and Compliance, and Communications.

Operational Performance.

This functionality covers data that is related to short term performance statistics. These statistics may relate, for example, to the performance of the queuing system within the account opening system, by which applications can be filtered by application status, so that staff can work through and clear outstanding applications.

By milestone or task, data may be acquired that measures how these applications are progressed and cleared. Exemplary areas of interest for statistics gathering include one or more of the following:

- Volumes of applications received in the queue that require action
- Time taken to clear an action
- Reasons applications are appearing in the queue (e.g. which application status, where in the process has the referral come from, etc.)
- Queue activity by individual staff members or by department/team
- Sales MI for individual staff members or by department/team Operational Management.

This functionality covers data that relates to the hands-on, day-to-day operational and resource management issues. This data may help the business understand which applications are entering the queue, so that Operations managers can ensure they have the right resources in the right place at the right time.

In various embodiments, this may include one or more of the following:

- Ability to query account opening queue data over different time periods (e.g. hourly, daily, weekly, monthly)
- Volumes being referred, reason for referral, and from which milestone component the referral originated from
- Data to track trends related to busiest times of day, busiest teams, busiest staff, etc.
- Ability to use data to determine if an area is deficient in resource at any given time and allocate other resource to assist (may involve giving temporary entitlements to staff to cover areas they do not normally cover)
- Ability to monitor Service Level Agreements to ensure that applications are being cleared within the allotted timescales
- Ability to collect data that ties staff performance to sales targets (performance management)
- Ability to monitor the different types of product and report how many products are being opened by channel, the propensity to apply for certain products through certain channels, etc. (preferably at a system, department, agent, and channel level)

Save and Retrieve.

Information may also be collected that shows how the save and retrieve functionality is being used. This includes data showing how save and retrieve is being utilized and accepted by customers.

For example, data that can be queried by business users may be collected in one or more of the following areas:

- Volumes being saved (including number of times the same application is saved)
- Volumes being retrieved (including the number of time the same application is retrieved)
- Time elapsed between the save and retrieve stages
- How many applications remain uncompleted after a retrieve has been completed
- Number of saves per each milestone component (e.g., if a certain component showed a large number of saves, the data might point to an issue with the component)
- Data of saves/retrieves by customer type, product type, channel, etc.
- Data related to channel switches between the save and the retrieve stages (e.g., saved on internet, retrieved through call center)
- Data related to application aging Audit and Compliance.

In some embodiments, an audit may be performed of applications received and details of actions that have taken place during the application lifecycle. This is preferably in line with audit requirements for existing account opening systems and should contain all relevant information.

Audit and Compliance teams may not need instant and continuous access to this type of data, but need to be able to pull it on demand when required, so preferably this data is kept on an on-going basis.

The AO framework can maintain traceability of user actions by logging this information against a User Action History table in APe. Outbound customer communications and interactions between CSRs/staff/agents and customers may be logged in the communication history and contact history tables, respectively.

Communications.

Data related to an Integrated Customer Communications Module (ICCM) linked to the account opening system may also be tracked. This may include, for example, one or more of the following areas:

- Maintaining an audit trail of a communication chain for follow up in case of issues (history)
- Data related to process, performance, and cost (how long does it take to issue communication, how many issued by each method, cost per method of communication, etc.)
- Monitoring of Service Level Agreements in terms of how quickly communication is issued against the targets
- Allow business to define and run queries specifically related to communication data Surveys.

Surveys in this context refer to analysis the business may wish to carry out in relation to the application process itself, rather than any analysis of other MI or metrics. These may include, for example, customer satisfaction and recommendation surveys. Such information may enable the business to understand the application process to see if it can be improved upon.

A survey building function may optionally be included in the account opening system. Surveys outside of account opening may optionally be "plugged" into the process at the point the business wishes to place it. In some embodiments, this type of survey is placed at the end of an application process so as not to distract the customer away from opening the account.

Some examples of the types of surveys the business may wish to use include Application Abandonment Surveys (what are the reasons applications are being abandoned?) and Post Application Surveys (consulting the customer to appraise the account opening process).

However, with the ability to plug in surveys built outside of the account opening system, any customizable survey could be added as required, as long as data from the application (tracking ID, application ID, product type, etc.) can be passed into the survey.

Where surveys are included in the account opening process, all the data related to the survey is preferably stored and available to the business to define, run, and store queries to drive reporting.

This data is preferably captured at an individual customer level, so that there is a direct link to applicants for any potential follow up, but may also allow aggregation to understand trends by customer type, product, channel, etc.

For example, if a customer provides comments (good or bad) about the process and would like for the bank to contact them to discuss further, details may be captured at the individual level to allow this to happen. As a by-product, this process will also capture customer type, product, and channel information thus allowing trending analysis.

This data allows in depth analysis of the application process to see where improvement might be made. In addition, with the flexibility of the system and milestone components, the business can easily test new scenarios based on the feedback of such surveys.

In some embodiments of the invention, the AO Front End (FE) will log MI key events and with application data according to Standard Logging Specifications. Table 1 lists exemplary key events that may be logged in AO FE.

TABLE 1

| AO Milestones | AO EVENT | Definition |
|---|---|---|
| AO entry | Create Application | This event indicates that the application process been started. |
| GAD (Gather Application Data) | Personal Details screen shown | This event shows that the personal details screen was displayed to the user. |
| GAD | Personal Details submit | This event shows that the personal details of the applicant are captured by the FE (after the user clicks on the "continue" button from the "Personal Details" screen) |
| GAD | Contact Details screen shown | This event shows that the contact details screen was displayed to the user. |
| GAD | Contact Details submit | This event shows that the contact details of the applicant are captured by the FE (after the user clicks on the "continue" button from the "Contact Details" screen) |
| VI (Validate Identity) | VI status successful | This event shows that the applicant's identify has been verified (Validate Identity successful), F/E will log this where available. |
| GAD | Employment details screen shown | This event shows that the employment details screen was displayed to the applicant. |
| GAD | Employment details submit | This event shows that the employment details of the applicant were captured by the FE (after the user clicks on the "continue" button from the "Employment Details" screen). |
| GAD | Review Application screen shown | This event indicates that the applicant was shown the "Review Application" screen. |
| GAD | Review Application screen submit | This event indicates that the applicant continued with the application process after reviewing the details (after the user clicks on the "continue" or "apply" button from the "Review Application" screen) |
| Product Configuration | Product Config screen shown | This event indicates that the applicant was shown the "Configure Product" screen. |
| Product Configuration | Product Config submit | This event indicates that the applicant continued after the "Configure Product" screen (after the user clicks on the "continue" button from the "Configure Product" screen) |
| T&C (Terms&Conditions) | T&C screen shown. | This event indicates that the applicant was shown the "Terms and Conditions" screen. |
| T&C | T&C accept | This event indicates that the applicant accept and continued after the "Terms and Conditions" screen (after the user clicks on the "continue" button from the "Terms and Conditions" screen) |
| T&C | Decline T&C | This event indicates that the applicant decline and continued after the "Terms and Conditions" screen (after the user clicks on the "continue" button from the "Terms and Conditions" screen) |
| Decisioning | Decision screen shown. | This event indicates that the applicant was shown the "Decision" screen. |
| Decisioning | Accept Offer submit (Decision status = approved & product status = accept) | This event indicates that the applicant accepted the product after the "Decision" screen was shown (after the user clicks on the "accept" button from the "Decision" screen) |
| Decisioning | Decline Offer | This event indicates that the applicant decline the product after the "Decision" screen was shown (after the user clicks on the "accept" button |
| Funding | Funding screen shown | This event indicates that the applicant was shown the "Funding" screen. |
| Funding | Funding data submit | This event indicates that the applicant completed the "Funding" screen (F/E captured the funding instructions) |

TABLE 1-continued

| AO Milestones | AO EVENT | Definition |
|---|---|---|
| Boarding | Application Summary (boarding) successful | This event indicates that the account was successfully setup for the applicant (boarding or fulfilment successful), where available to F/E. |
| Boarding | Application Summary (boarding) fail. | This event indicates that the account was not successfully setup for the applicant (boarding or fulfilment failed) where available to F/E. |
| Any milestone | Save and exit | This event indicates that the applicant choose to save and exit the application in the given UI flow. |
| Any milestone | Exit | This event indicates that the application is abandoned by the user. |
| Retrieve | Retrieve application | This event indicates that the applicant retrieved the application in a given UI flow. |
| Decisioning | Product offer is up sell | This event indicates that the applicant was given the option for up sale. |
| Decisioning | Product offer is down sell | This event indicates that the applicant was given the option for down sale etc. |
| Decisioning | Up sell product accept | This event indicates that the applicant has chosen to select the given an up sale option. |
| Decisioning | Down sell product accept | This event indicates that the applicant has chosen to select the given a down sale option. |
| Decisioning | Decision status approved by system | This event indicates that the application was approved. |
| Decisioning | Decision status decline by system | This event indicates that the application was rejected. |
| Decisioning | Decision status referred | This event indicates that the application was referred to be carried over by the work flow, will be logged where available to the F/E. |
| Pre-product selector | Pre-product selector screen shown | This event shows that the pre-product selector screen was displayed to the user. |
| Pre-product selector | Pre-product selector page submit | This event shows that the pre-product selector are captured by the FE (after the user clicks on the "continue" button from the "Pre-product selector" screen) |
| Entity local journey | Any local entity screen/journey that AO will exit to or re-entry from. | Entity specific Key Events for local exits and re-entry points (such as navigation, onsite search, external links to local entity pages and re-entry into AO etc.) Need acquire the key events id from BI team. |

Local Exit Metrics.

In some embodiments, if new AO screens are introduced into the AO journey to support local exit points, new key events will be defined for known exit and re-entry points within the AO journey. Key event data will be logged (e.g., by the local entity) within these journeys and will be available within BI to support journey funnel reporting.

In the case where the local exit screens are not within the AO journey, AO will log exit events before taking the user to a non-AO local screen (local journey). In some embodiments, AO Front End (FE) may not support re-entry tracking for these instances, as the non-AO local screen may not be based on portlet technology. However, once the user re-enters AO will track the next screen(s).

Configuration Options.

Data from the AO FE and the Application Processing Engine (APe) may be used to track configuration options at the product and applicant level.

In some embodiments, the AO FE data are used for identifying what configuration options are offered to each applicant, and APe data are used to identify the configuration options that were selected by the applicant. The data are preferably available at both the applicant and product levels.

AO FE will first retrieve a list of product level and applicant level options from APe. FE will then retrieve details from APe regarding how to render the options on the screen (e.g., based on predetermined parameters), which will include what fields are mandatory, hidden, and any other conditions.

Additionally, AO FE will preferably make the Configuration ID (as provided by the channel) available to be logged as an attribute for the key events.

Differentiate Between 'Empty' and 'Started' Applications.

When an application is started (channel or AO Entry Utility passes data into AO), the status of the application is set to 'Started' by APe (identifying an 'empty' application). When the user saves, or continues, from the first AO FE screen (Gather Application Data 1 screen), AO FE will notify APe to set the status to 'In Progress'.

Acceptance of Offer Versus Acceptance of Terms & Conditions.

'Acceptance of Offer' within the application process is not an indicator of acceptance of T&Cs but only acceptance of the offer.

In some embodiments, AO FE will log the following events related to Acceptance of T&C and Acceptance of the Offer:
 For Accept T&C, log two key events, one when the T&C is displayed to the applicant and the other when the applicant accepts the T&C and continues from the T&C decision screen
 For Accept Offer, log two key events, one when the Product Offer page is displayed to the applicant and the other when the applicant accepts the offer and continues from the decision screen In some embodiments, for single-product applications, AO FE will log both Accept T&C and Accept Offer in the same screen, whereas for multi-product applications AO FE will log the acceptances depending on where they are shown to the applicant.

Similarly, AO FE may log different key events, Decline Offer and Decline T&C, when the applicant declines the offer and declines the T&C, respectively.

Staff Member Actions.

In some embodiments, all actions undertaken by a staff member during AO are logged and available at the individual staff member level. This data preferably includes the time taken for the staff member to complete the task where this relates to application maintenance functions based on Work Items.

AO FE will log the time difference between rendering of the page until the staff user selects to continue from the page. This will be done for every screen of the Core journey with the exception of the Application Maintenance screens. AO FE will only log the time duration until the click of the continue button and not for the display of the page.

Business Process ID and Flow ID.

Business Process ID and Flow ID are preferably logged by AO FE for each BI event. Business Process ID (used by APe) and Flow ID (used by FE) may be used to determine/define a sequence of screens/processes for an End to End AO journey. Logging these IDs may enable an entity to track the success of a respective journey definition so that a business practitioner can modify it (as needed). This function thus supports Test & Learn tactics.

Pre-Product Selector—Key Events to be Implemented by Entity.

The pre-product selector (PPS) refers to a function where only the most essential elements are gathered and then decisioned in advance of AO in order to direct the applicant to a product. In some embodiments, the PPS is implemented by the entity, and no AO FE screen is delivered in the AO Core journey. AO Core may use the standalone test harness portlet to unit test the APe service that will be delivered. In some embodiments, two entity-implemented key events support logging at the entity: (1) Pre-Product Selector screen display key event; and (2) Pre-Product Selector continue key event.

MI provides entity-implementation key event information for the PPS. The local entity may follow the MI logging integration guide to build the MI logging for the key events. In this case, the local entity pre-production selector journey will log the key events before the display of the Pre-Product selector screen and/or continue from the Pre-Product selector screen.

Branch ID.

In some embodiments, as part of the application process, the Branch ID of where the action took place will be logged. AO FE will receive the Branch ID from the channel and log it for all appropriate events. For an Internet Channel, this ID may, for example, be the website URL; for a Call Center channel, it may be the Country and Location of the Call Center; and for Branch this item may hold the value of the "Branch ID" passed to AO FE from the Branch staff channel.

Preferably, AO follows standard Webtrends® tagging in both AO Journey flow and Application Maintenance. In some embodiments, data to be cut and viewed from many different angles (customer group, business line, product line, etc.) are tagged as described below. All sites may be tagged to this minimum standard before they can be approved to go live.

The following items form an exemplary tagging strategy: (a) Link to top_section.js file; (b) Sitewide tags; (c) Context tags; (d) Page events; (e) JavaScript version code; (f) NoScript tag; (g) Link to bottom_section.js file. The order that the elements appear on a page may be as they are listed above.

To support the creation of Sales Funnel reports which will highlight the effectiveness of Account Opening campaigns and journeys, BI may define several data feeds and provide a tracking ID solution that can be mined. This data will then be used to generate reports.

The tracking ID solution can enable measurement and optimization from journey point of origin for critical measures such as cost per account and drive post account opening customer demographics. In some embodiments, a Sales Services system may be responsible for the generation and management of tracking ID.

BI may also define real time queue management data feeds and harness the data to generate reports that can enable various measures to be tracked, for example, staff productivity based on rate per hour, processing against service level agreements (SLAs), queue volumes and throughput, etc.

An exemplary Sales Process Funnel moves from Responses→Sales Dialogue→Product Application Start→Applications in Progress (or Pending)→Applications Approved→Applications Accepted→Applications Boarded.

Figure 6:
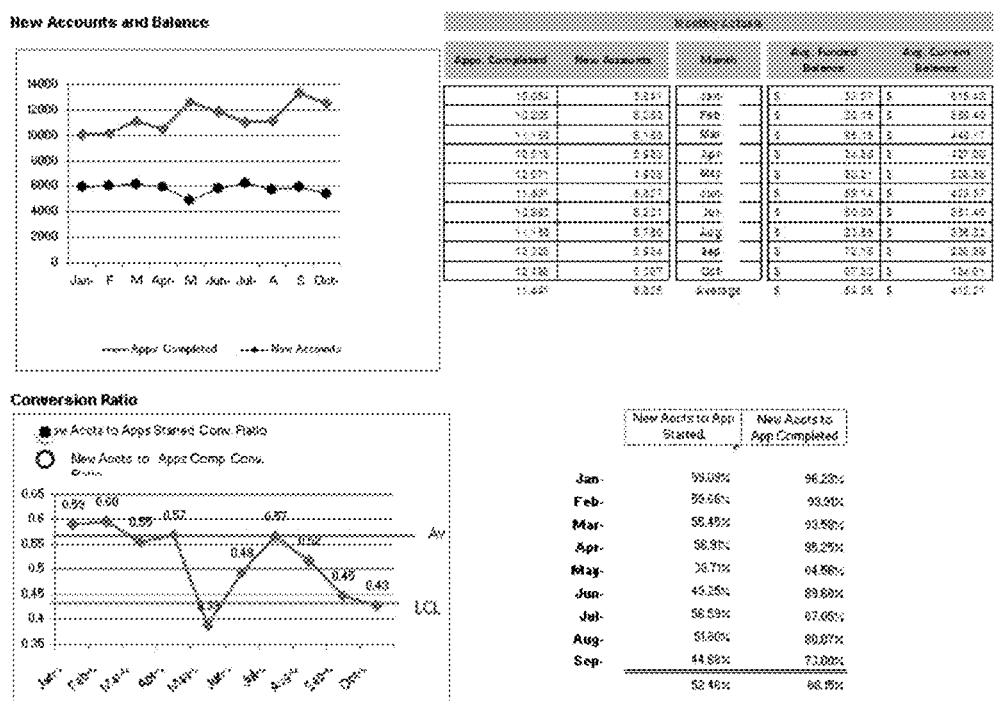
FIG. 6 shows an exemplary Sales Application Funnel report.

The Sales Application Funnel report gives a holistic view of the end-to-end (E2E) sales application funnel. This can allow a business to understand the sales flow/E2E sales application journey and the value it brings to the company, quickly identify problem area(s), and seek optimization. An exemplary Sales Application Funnel report is shown in FIG. 6.

The Sales Application Funnel report may include, for example, performance of important KPIs in tables and/or graphs, volume numbers for each funnel stage, conversion rates between each of the funnel stages, balances (initial and more), etc. In various embodiments, the Sales Application Funnel report may provide conversion rate graphs with Lower Control Limit (LCL) and Upper Control Limit (UCL), traffic lights and alert functionalities for selected KPIs, "Show Detail" button showing funnel counts and conversion rates, and/or filters (e.g., initiating channel, product classes, date view, date range).

An exemplary Sales Journey Funnel moves from Create Application→Save Personal Details→Save Contact Details→Save Employee Details→Save Product Configuration→Save Product Options→Save Funding Instruction→Decision Application Accept Offer/Decline Offer→Open Account.

The Application Journey report shows the conversion rates through the screens for a front end AO journey using the front end key events. This can allow the business to understand directionally, and find opportunity to enhance, the front end customer experience for each journey.

The Application Journey report may include, for example, a count of applications for each front end journey event (screen order, screen description), conversion rates between each event, incomplete number of applications and its percent of total applications started, tracking (e.g., ten weeks of history), and/or various filters (search functionality for product, channel, campaign, journey ID, journey name, date, etc.).

An exemplary Media Funnel moves from Views→Responses→Sales Dialogue→Product Application Start→In Progress→Approved→Accepted→Boarded.

The Media Funnel report shows data to optimize media spending. This can allow a business to spend money wisely by utilizing the best channel(s) and method(s).

Figure 7:
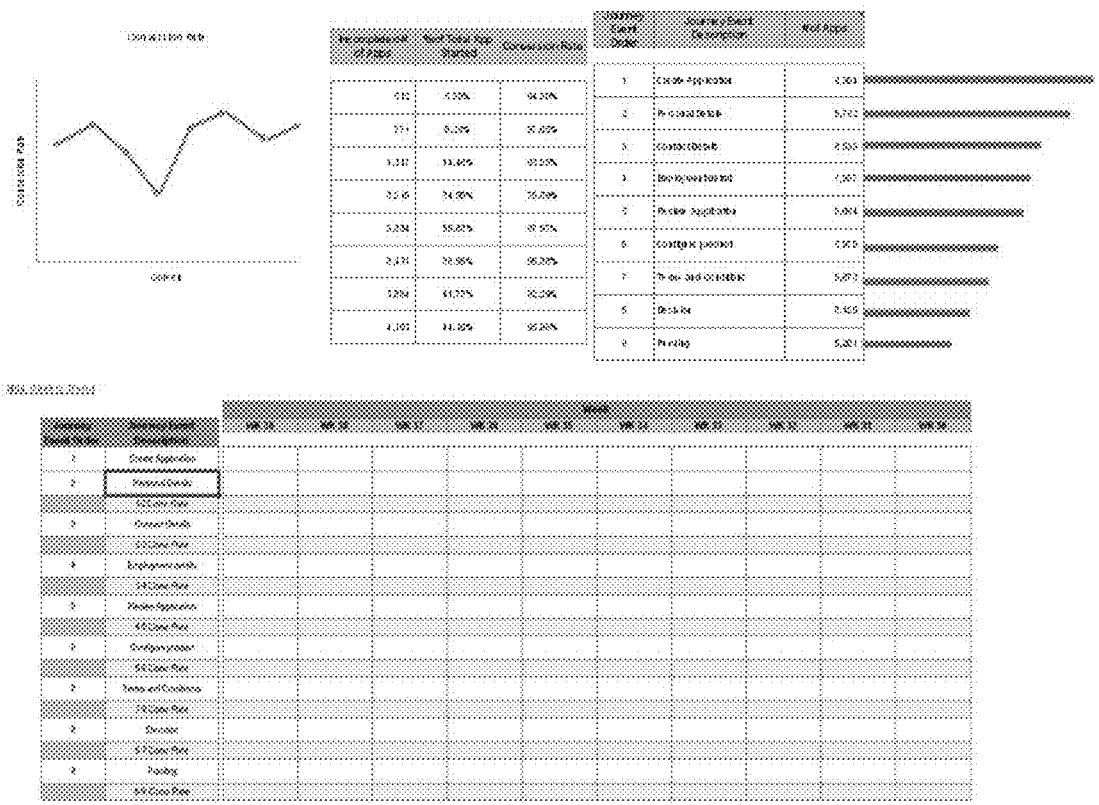
FIG. 7 shows an exemplary Media Funnel report.

The Media Funnel report may include, for example, count of media funnel for each stage including cost, conversion rates between funnel stages, "cost per" for each of the funnel stages, and/or tracking (lead, planned and unplanned sales, balances, etc.). The Media Funnel report may also provide, for example, one or more of the following functionalities: dynamic bar graphs (e.g., showing half vertically sliced funnel view); link to trending reports (e.g., twelve weeks trending report); hide/show link for lead, planned and unplanned sales and balances; filters (e.g. search functionality for Media and campaign; Product Category and dates). An exemplary Media Funnel report is shown in FIG. 7.

Additional reports that may be provided by BI are described below:

A Dashboard report shows data such as, but not limited to:
1. Sales (penetration by channel, number of applicants, product category, Sales grouping, channel usage, STP, Revenue and cost)
2. Customer (Acquired number of customers by Customer type and business line along with Total cost per Customer Acquired)
3. Applications (number of Application started, approved, accepted and completed during the reporting period and Total cost associated for each status)
4. Media (Media cost, number of views and clicks, Click through rate, and cost per view and Click)
5. Conversion rate Key Performance Indicators that will measure the performance of the business against target Annual Operating Plan (AOP)
6. Positive or Negative trending indicator to understand the performance over time
7. Comparison between current period vs. previous period-captures a quick understanding of business changes by comparing current data to previous data presented side by side
8. Target bar that graphically shows YTD actual vs. YTD target goal for each measure.

Figure 8:
FIG. 8 shows an exemplary Dashboard report.

This allows a business to measure and operate according to plan (AOP). Filters may include, for example: Metrics Reporting Overview, Organization, Channel, Business Line, Customer Type, Product, and Time (Yearly, Quarterly, Monthly, Weekly, etc.). An exemplary Dashboard report is shown in FIG. 8.

A Daily Report shows Application Started, Application Completed and New Accounts information for a rolling (e.g., 31-day) period. This allows a business to monitor application and sales activity on a daily basis and respond quickly when necessary.

A Daily Tracking Report tracks accounts booked, for example by individual tracking ID, referral ID or voucher code. This allows a business to review how individual tracking IDs, referral IDs and voucher codes are performing.

A Staff Funnel report shows a staff involvement in AO application process. This allows a business to understand staff cost in relation to AO processes, optimize staff involvement, and determine staff efficiency level in the AO process.

A Product Application Decisions:Approval Ratio report shows data to review decision outcomes for product applications and applicants by channel and product category. This allows a business to understand the approval ratio for each product category and channel and seek improvements.

A Product Applications Age at Status report tracks the age of an application from the application start date/time at each application status. This allows a business to understand the average time it takes for a customer to finish an application and seek opportunities to minimize that time.

A Configuration Options Report shows the configuration options offered, accepted and their penetration rates. This allows a business to validate configuration options offered to customers by product category or product and optimize acceptance rate.

A Communications Efficiency Report shows the number of communications distributed through each communication channel during the AO process. This allows a business to track communications sent during the AO process to reduce unnecessary communication and therefore save cost, and to understand the effective number and type of communications sent that will lead to a sale.

Each report preferably has prompts that allow the business to select and see only the required data. The prompt panel may be provided to the left of each report. In some embodiments, functionality to hide and show the prompt panel may be provided.

All reports and prompts will preferably show data in the local language, for example, based on the Cognos user preference. In some embodiments, if the preference is set to any language other than 'English', the data from the National Language Support (NLS) fields/columns will be fetched from the data warehouse. In some embodiments, the report column titles, and any text on the report that was applied during design, will be in English regardless of the user preference. One local language per entity is supported.

In some embodiments, HTML is the supported format to run the reports. Reporting format and functionality in the reports will use HTML codes to meet the business requirements. In certain embodiments, the report can be run in another format, such as PDF or XLS, but the report output with respect to the format may not be same as the HTML format. Formats other than those mentioned above (e.g., .csv, .xml) may not necessarily be supported.

Preferably, there will be no local date time conversions in the report during run time; it will be as per the data stored in the data warehouse. The source systems are expected to record data in the local time zone of the entity. However, if this is not the case then a pre-processor may be in place to convert the system times into local time zone for storage into the data warehouse.

In some embodiments, the reports will be scheduled to pre-run and save the report output in HTML format. Excluded are the reports that require a mandatory input (e.g., tracking ID) or wherein at least one of the filters does not have a default value. In some cases, the data access implementation based on the user entitlements, if any, may also prevent reports from being pre-run.

Figure 9:
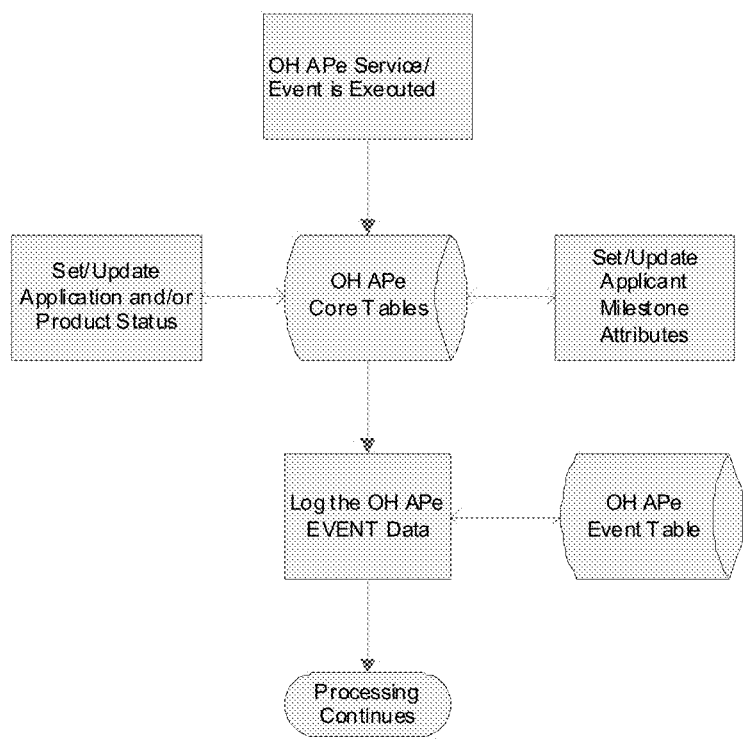
FIG. 9 illustrates APe data logging processes, according to some embodiments.

As a major metrics provider of data to One HSBC Business Intelligence (OHBI), according to some embodiments, OH APe will generate data extracts according to the layout as defined by OHBI Logging Specifications. To facilitate this requirement, OH APe will track and log status changes for each application processed. This may include statuses at the application, applicant, and product level. FIG. 9 illustrates APe data logging processes, according to some embodiments These status changes will be captured in an APe "Event" Table, which will serve as the primary data source that will feed into the Extracts what will be transmitted to OHBI (e.g., Daily and Hourly).

These Events will include Product and Application Status changes, along with Applicant related "milestones," which will be quantified as individual attributes that will be set within OH APe Tables to denote the status and/or completion of that Applicant's required action.

Figure 10:
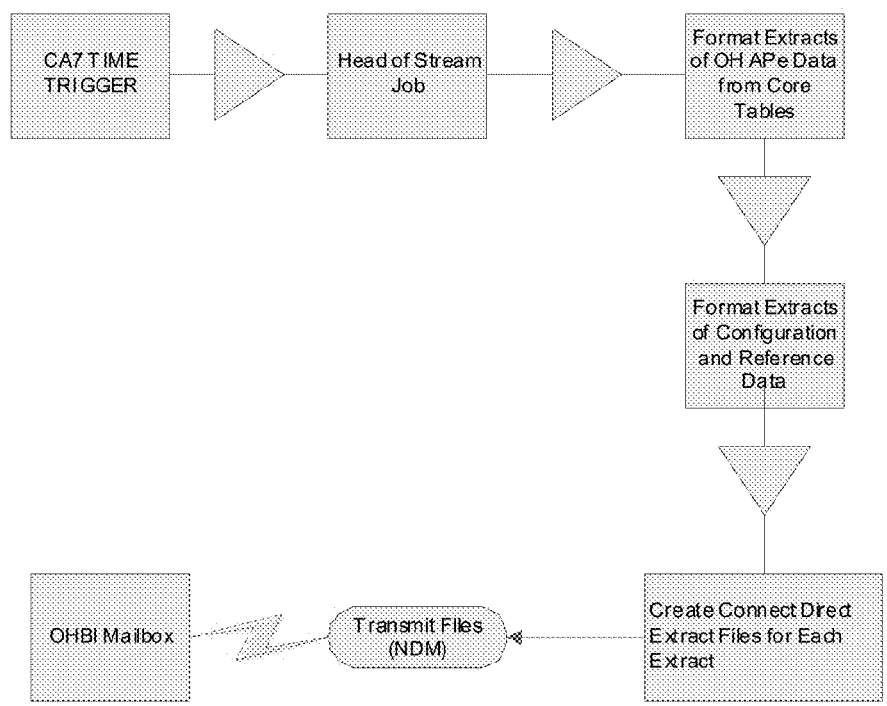
FIG. 10 illustrates APe extract processing, according to some embodiments

Using these Events as a point of reference, in some embodiments, the various data elements needed for metrics will be taken from the respective OH APe Core Tables and formatted into the files to be transmitted to OHBI, as shown in FIG. 10.

In addition to these "aggregated" extracts, OH APe will also create Table Extracts of configuration and reference data.

Various operation reports may be presented via the QMS Administration function. Preferably, QMS maintains an internal audit log table, which tracks all workflow events with details like user action, time of the event, and other related information. The audit trail will provide the raw data for generating QMS reports in conjunction with the work item details.

An entitled user can access the QMS Admin Function to retrieve the QMS reports and select a particular report to view.

In some embodiments, QMS will keep the report data for three months and supports for up to three months reporting.

In some embodiments, QMS will also export the QMS report data to OHBI on daily basis for historical reporting. The report data files will be generated at a designated time (e.g., 00:00 in the local entity time zone for OHBI). As shown in the examples in Table 2, QMS may maintain a configuration file for entity time zones, which allows the WFS Admin Function to generate and present the reports in local entity time zone.

TABLE 2

| Entity Code | Entity Time Zone | Entity Location |
|---|---|---|
| HBMY | GMT+8:00 | Asia/Kuala_Lumpur |
| HBUS | GMT−8:00 | America/Los_Angeles |

Figure 11:
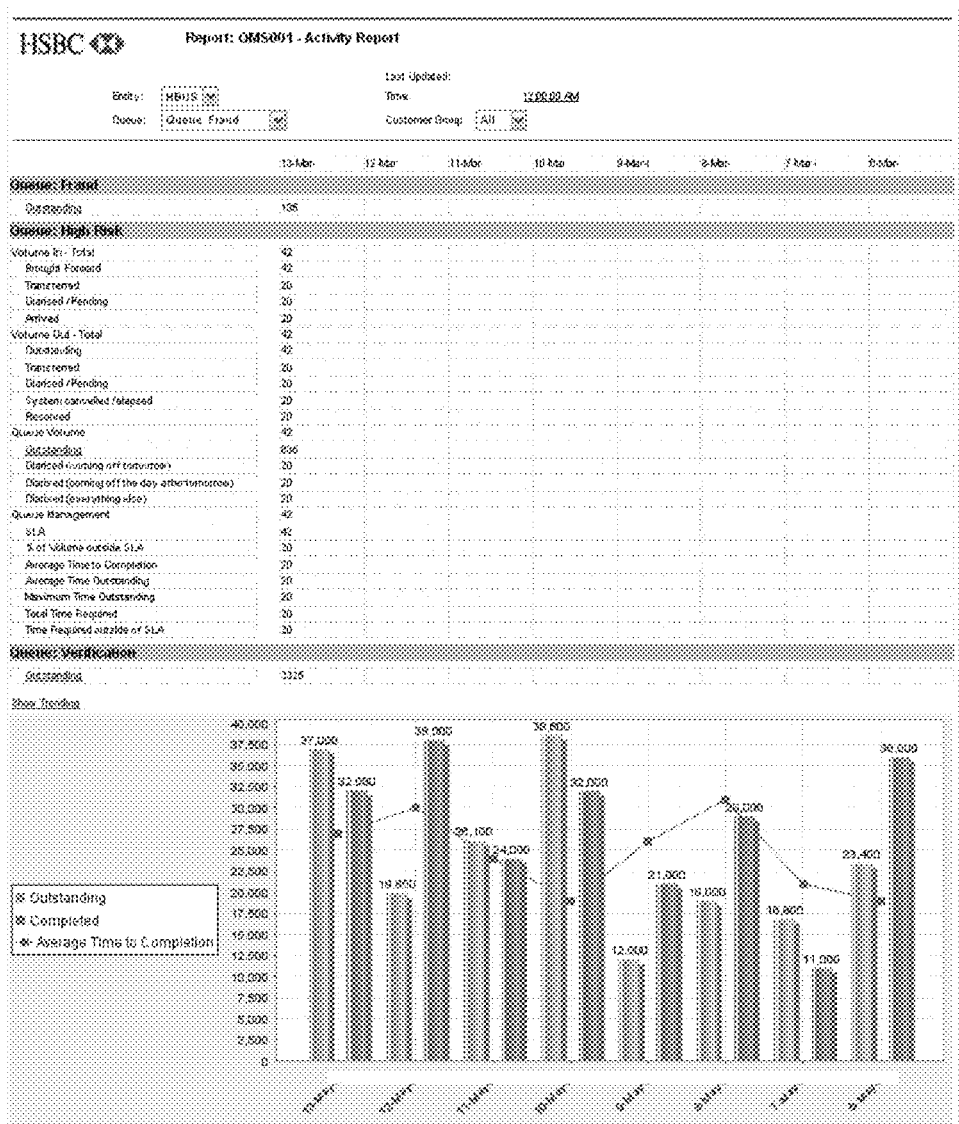
FIG. 11 shows an exemplary Queue Management System (QMS) Activity report.

One exemplary QMS report is an Activity Report, as shown, for example, in FIG. 11. This report provides the number of work items outstanding in work queues, with SLA information to allow the manager/supervisor allocating the manpower to complete the works. The Activity Report can provide work item volume in queues with SLA information by queue and display data for the previous seven days of the report day. The Activity Report is preferably available in real time, and retained for three months.

QMS may also present an Hourly Queue Volume Report. This report provides the number of work items brought forward from yesterday, entering today, completing from and remaining in a work queue, and the oldest date of the items during the reporting periods. It may contain, for example, the number of work items brought forward from yesterday, arrived today, total items today, coming out from and remaining in a work queue for the report day. The Hourly Queue Volume Report is preferably available in real time, and retained for 30 calendar days.

The Queue Volume can show number of queue items that have arrived in the queue on the reporting day or have been transferred in from another queue. The time interval may, for example, be one hour from between 0:00 to 23:59 at local entity time zone. Queue Volume may be shown by Entity, Queue (e.g., Fraud, High Risk, Verification), and/or Customer Group.

Figure 12:
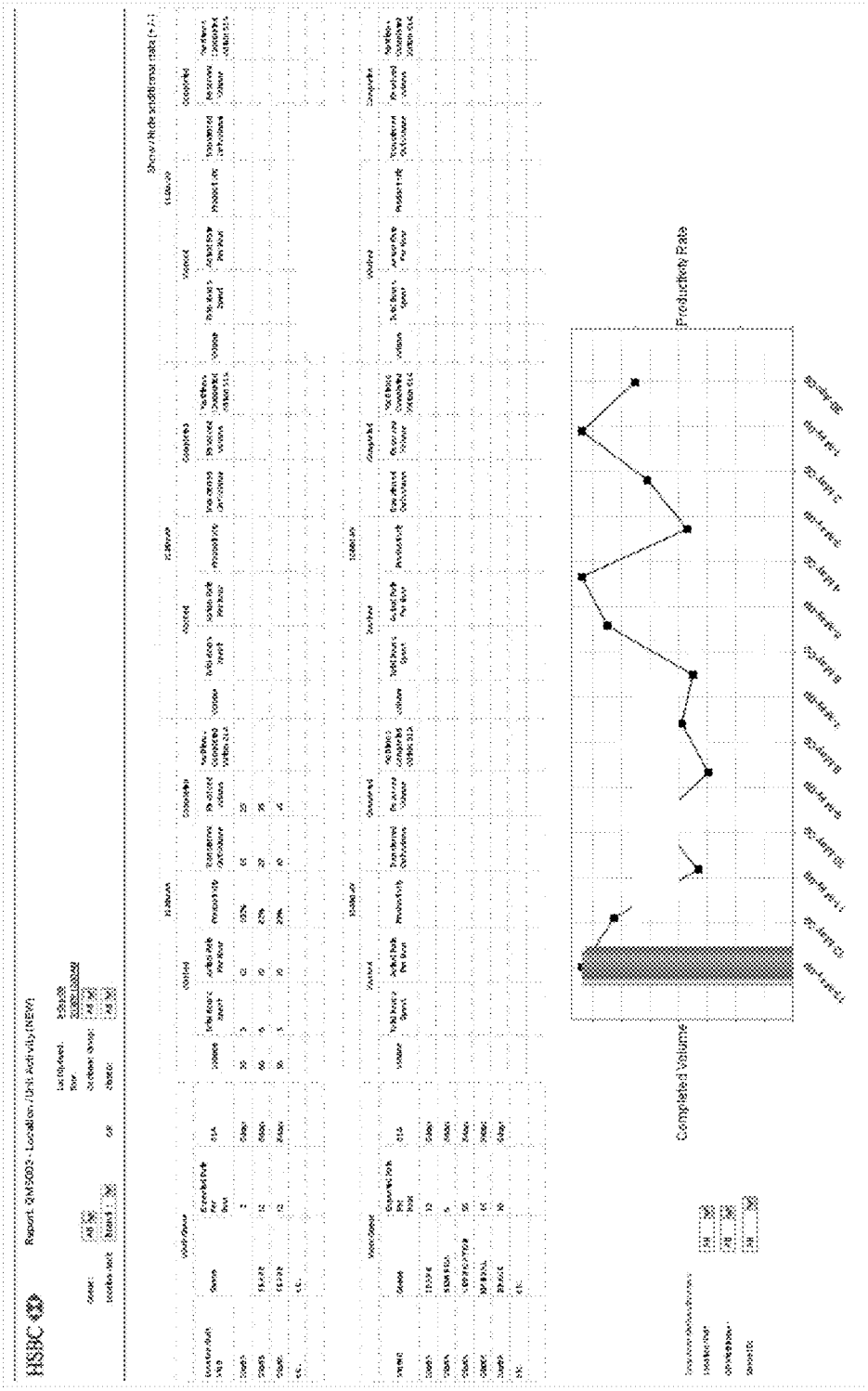
FIG. 12 shows an exemplary QMS Location/Unit Activity report.

Another exemplary QMS report indicates Location/Unit Activity, for example as shown in FIG. 12. This report provides the number of work items going into and coming out from a work queue at hourly periods for the report day, for the manager/supervisor to identify the busiest period of the day. The Location/Unit Activity Report is preferably available in real time, and retained for three months. In some embodiments, QMS may the 'user group name' as the 'Location/Branch' filter.

The workflow activity logs are exported from QMS to OHBI for standardized reporting and usage documentation. In QMS, the activity logging includes every status change of work item during its life cycle, from creation to purging, triggered either by end users or by system process. In some embodiments, QMS exports all activity logs and uploads to the OHBI server via SCP at entity day end.

Figure 13:
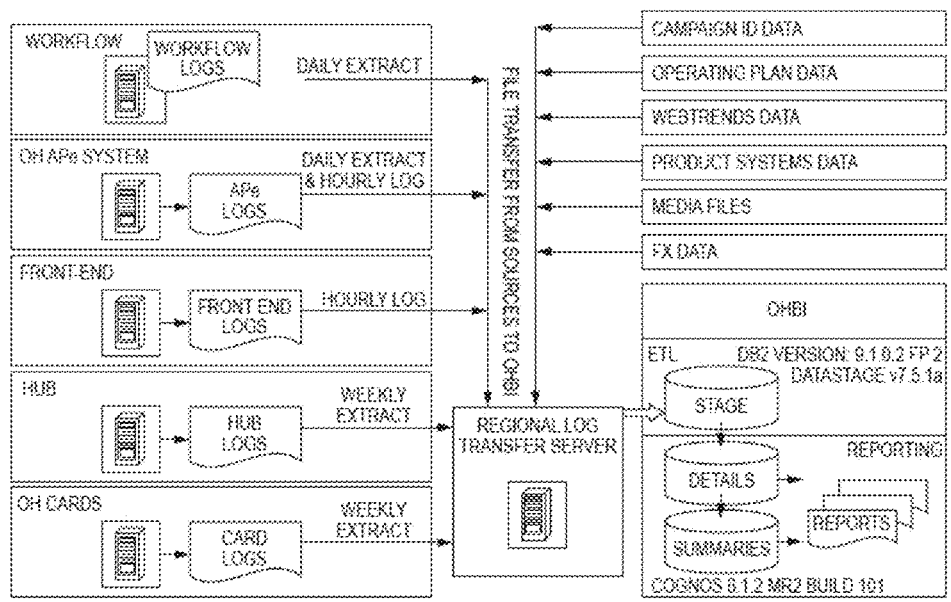
FIG. 13 is an exemplary diagram showing data flow from a variety of data sources to OHBI, according to some embodiments.

As shown, for example, in FIG. 13, source data are received by OHBI according to the agreed specifications and frequencies into a standard landing directory on an Extraction, Transformation and Loading (ETL) server. Data will be received from certified data sources and processed. Exemplary OHBI AO data sources include:

QMS—A daily extraction from the QMS containing data on the Queues

APe—A set of daily data extractions for the APe tables containing data on Applications, Product Applications, and Applicants, as well as data on funding and to-do's (a further file that contains event based transactions may, for example, be created hourly and transmitted)

ICCM—A daily data extraction of communications data

Front End—An hourly log from each staff- and customer-facing Internet application server, including key events that are happening on the front end (in some embodiments, no log files are recorded from the application maintenance and QMS applications)

CPT—A weekly update sent from CPT that contains balance information on accounts

Tracking ID Database—A daily extract of data relating to tracking IDs

Webtrends®—A daily feed retrieved from Webtrends® for processing by OHBI

In addition to automated data coming from the above systems there may also be a set of OHBI entity load files that an entity can populate to load entity specific data directly to the OHBI server. If any new or additional information is required to be loaded using the files then they are preferably stored in the OHBI loading directory where a daily job will check for their presence. Upon finding any files the process will perform an Update/Insert into the appropriate table to ensure the data is present.

The following list describes an exemplary set of load files that an entity will preferably populate prior to use:

Media data file—this file will contain consolidated data from the media agencies that the entity deals with Operating plan file—this file contains the plan data for the products to be sold, the granularity of the plan will be: week number, week date, product code, channel and geographical site Staff Costs file—this file will include standard FTE staff costs by level/grade, etc.

ICCM costs and document types file—this file will include standard unit of costs for communication types and will also provide details on the types of document Product data file—this file contains a list of all the products that the entity sells and contains information about those products Reason Codes file—this file specifies the reason codes and descriptions Configuration Load—this file provides details of the product configurations Flow Load—this file provides details of the Flow IDs/names, etc.

QMS Load—this file provides details of the Queue SLAs, etc.

Currency exchange data file—this file supplies all the foreign exchange (FX) rates The ETL processes will store the detailed data and then run summary jobs on the data. There are daily, weekly, monthly, quarterly and yearly summaries run in the ETL. Once the summaries are completed the reports will use the tables to provide the reports to the business.

Webtrends® report data may be exported, for example, as an email attachment (with subject, recipients, and cc/bcc recipients specified) or using the secure FTP (SFTP) option available in the Webtrends On Demand® product (with FTP server, user name, password, and filename and location specified).

In some embodiments, for Connect:Enterprise® setup for SFTP there are four files to be deployed per entity into the ETL box, and the name of the file is as per the Webtrends® interface specification.

OHBI-CPT.

Product systems interface with OHBI-CPT and provide product and customer data. In some embodiments, this data (including elements such as Voucher Code, Line of Business and Referral Details) is received/processed on a daily basis. Weekly snapshots are then loaded into a CM table. Some product and customer related information may be loaded into OHBI CM directly from APe. This may be loaded into CPT via a CPT-CDM interface. In some embodiments, all customer and product level data including these three elements will be persisted in CPT. Product systems interfaces preferably support non-HUB country deployment.

Figure 14:
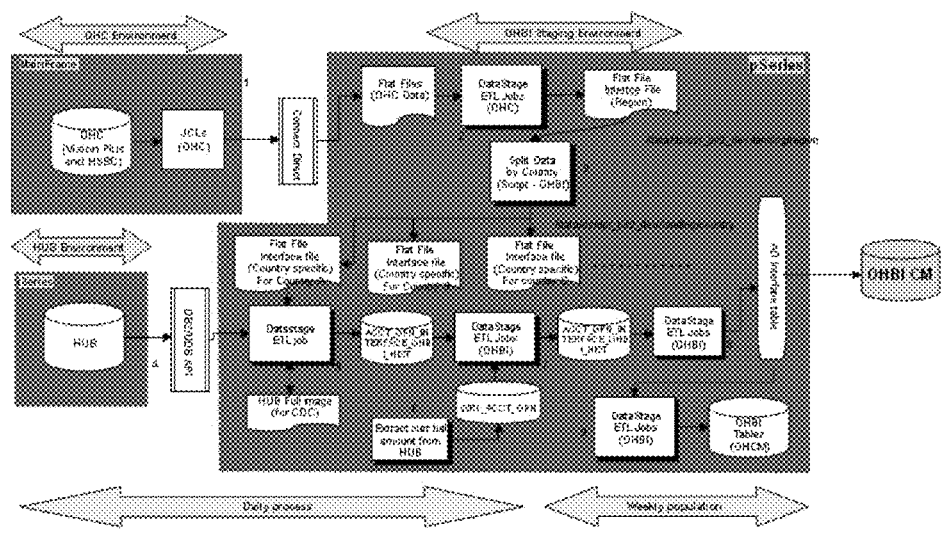
FIG. 14 is a schematic diagram showing data processing in CPT, according to some embodiments.

FIG. 14 is an exemplary diagram showing details of data processing in CPT from product systems to OHBI. The process shown is described below (the numbers in FIG. 14 correspond to the following numbers):

1. OHC extraction
   AO related data items are extracted from OHC system on mainframe. This extraction is done daily.
2. OHC ETL process to load interface files
   ETL jobs runs against extracted data files from OHC. These ETL jobs extracts data from the FTP data files to respective interface file (at a region level).
3. Split data from region specific to country specific
   A reference table is maintained (received every day from OHC), which maps local ORG codes from OHC system to respective country codes. A script is executed to split the data from region specific data file to country specific data file. These split country specific data file are loaded into country specific directories.
4. HUB extraction
   AO related data items are extracted from HUB system on iSeries. The extraction is done in real time.
5. Source ETL process
   New delta records from various source systems are consolidated before loading into 'ACCT_OPN_INTERFACE_OHBI_HIST'
6. Extract and derive amount value from source
7. Amount value for balance open amount is updated.
8. Other amount values are derived and the final interface file is populated. The interface file is populated into interface file on a daily basis (for one week).
9. This process runs on a weekly basis. Takes the input from interface file, generates SK (for ACCT_ARR) and populates target tables in OHCM database. Loading of data is done at entity level (e.g., a country can have multiple entities like HBUS, HBIO, etc.).

OH APe will format each extract according to the layout as defined by OHBI Logging Specifications. The transmission of the extracts is preferably via Connect:Direct® (originally called Network Data Mover (NDM)) to a mailbox created by OHBI for the individual entity. FIG. 10 shows a schematic diagram of APe extract processing.

QMS will provide an extract according to the layout defined by the OHBI Logging Specifications. This reporting will be hosted in QMS and use QMS tables.

AO FE is responsible for capturing required information to MI logging and Webtrends® for BI to compile the required BI reports. The logs will adhere to the OHBI Logging Specifications and will be transferred to the regional BI server.

ICCM will create an extract for sending to the OHBI system. The data sent over to the BI system may be used for the Communications Efficiency report. The OHBI extraction process will preferably be run after the ICCM reconciliation process has completed with the individual ICCM modules. This will ensure that the contents of the source table are up to date and accurate. In some embodiments, the extraction process will be daily and load required fields over to the OHBI tables using a DataStage® job. The contents of the extraction are as per the OHBI Communications data logging specifications.

OH Cards (OHC) will transmit credit card balances of accounts to CPT as well as a set of parameters relating to the card accounts. In addition, the OH Cards system may store other parameters, such as Referrer ID, Voucher Code, Tracking ID, etc. These will also be passed to CPT.

Core Banking (HUB) sends data to CPT regarding the account details of accounts for the entities. Three exemplary metrics data elements provided by HUB are Line of business, Voucher Code, and Referrer Details. All the fields will be captured during the AO account boarding process. HUB will expect APe to include these new metrics data in DD/TD account boarding messages and send to HUB. HUB will then capture and store the data in a HUB BI Staging file. No validation will be done on those new metrics data. BI will be responsible for retrieving data from this file.

Figure 15:
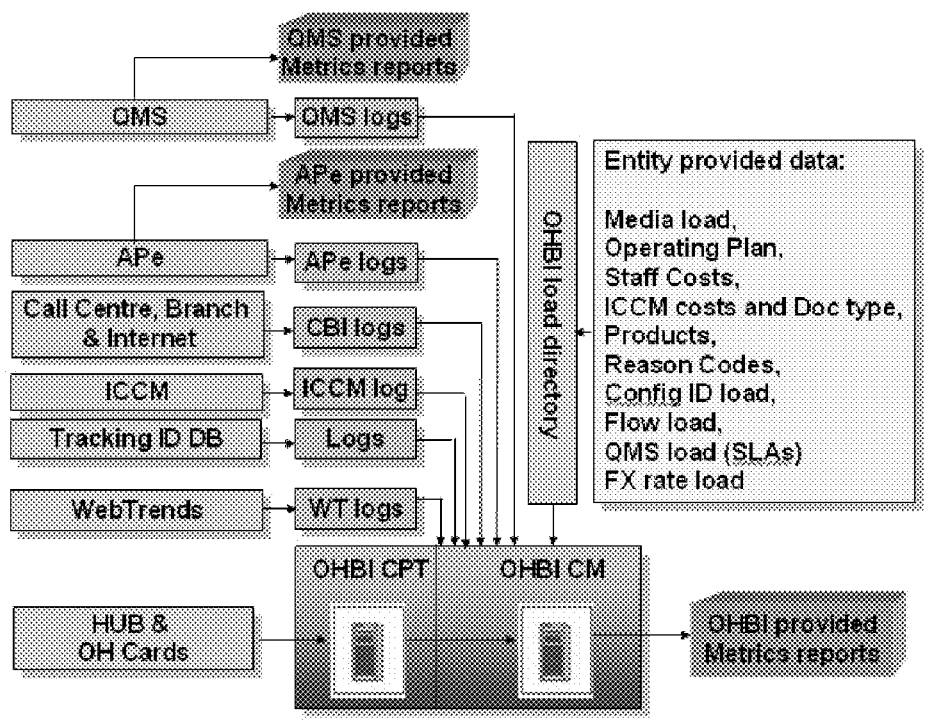
FIG. 15 is an exemplary diagram of BI Metrics architecture, according to some embodiments.

The overall Metrics solution comprises several source systems providing their data to BI and the reporting of the data comes from three different reporting platforms. FIG. 15 is a diagram showing the product systems inside the Metrics deliverable. The systems in the left-hand column are AO core components delivered, for example, by Software House. The 3D boxes are the reporting platforms (QMS/APe/OHBI-provided Metrics reports). QMS will be producing a set of reports and hosting their delivery; APe will also be producing a set of reports and hosting their delivery. The logs are the files that are created by the source systems and transmitted to OHBI for their usage. The "OHBI load directory" is the loading directory that HSBC bank legal entities will be able to load their files to. The rectangle labeled "Entity provided data" shows exemplary entity load files that may be expected. The boxes with computer icons show the OHBI systems CM and CPT.

Figure 16:
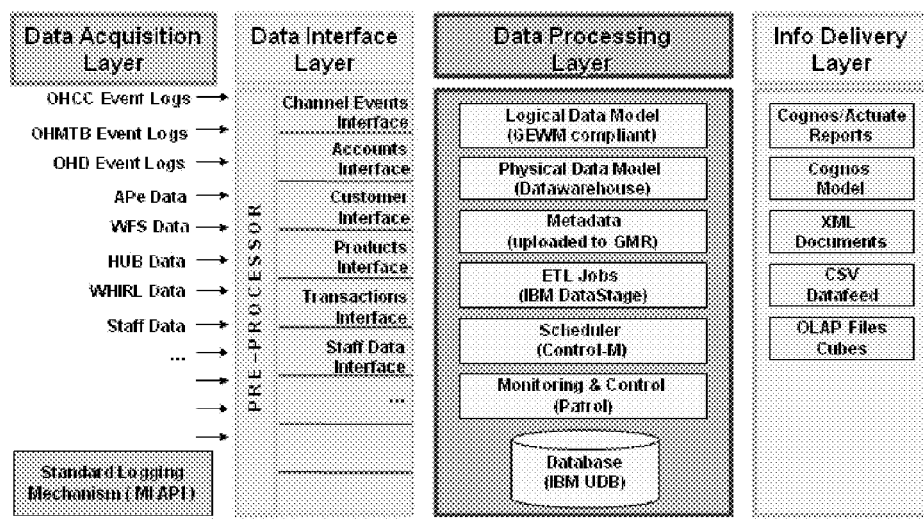
FIG. 16 is an exemplary diagram showing the conceptual OHBI architecture, according to some embodiments.

FIG. 16 is a diagram showing the conceptual OHBI architecture, including a data acquisition layer, a data interface layer with pre-processor, a data processing layer, and an information delivery layer.

The detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the instructions and/or operations performed may be referred to in terms, such as generating, determining, adding and/or comparing. The instructions and/or operations described herein which form part of the present invention are machine operations. Useful machines for performing the operation of the present invention include general purpose digital computers or similar devices that have been programmed to perform these specialized operations.

The present invention also relates to apparatus for performing these operations. This apparatus may be specially constructed for the required purpose or it may comprise a general purpose computer as selectively activated or reconfigured by a computer program stored in the computer. Various general purpose machines may be used with programs written in accordance with the teachings herein providing a specialized machine thereby, or it may prove more convenient to construct more specialized apparatus to perform the required method steps. The required structure for a variety of these machines will appear from the description given.

The system according to the invention may include a general purpose computer programmed in a particular manner, or a specially programmed special purpose computer. The user may interact with the system, for example, via a personal computer, wireless device, PDA, etc. Either of these may be implemented as a distributed computer system rather than a single computer. Similarly, the communications link may be a dedicated link, a modem over a POTS line, the Internet, an Intranet and/or any other method of communicating between computers and/or users. Moreover, the processing could be controlled by a software program on one or more computer systems or processors, or could even be partially or wholly implemented in hardware.

Although a single computer may be used, the system according to one or more embodiments of the invention is optionally suitably equipped with a multitude or combination of processors or storage devices. For example, the computer may be replaced by, or combined with, any suitable processing system operative in accordance with the concepts of embodiments of the present invention, laptop/notebook, mini, mainframe and super computers, wireless smart devices, as well as processing system network combinations of the same. Further, portions of the system may be provided in any appropriate electronic format, including, for example, provided over a communication line as electronic signals, provided on CD and/or DVD, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an object oriented and/or interpretive environment such as Java and transported to multiple destinations to various users.

It is to be understood that the invention is not limited in its application to the details of construction and to the arrangements of the components set forth in the description above or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

What is claimed is:

1. A metrics collection and analysis computer system architecture, comprising:
   a plurality of account opening data sources including at least one component of an account opening system and a local entity computer data source storing account opening data;
   at least one database storing metrics data associated with the account opening system;
   a computer system configured for communication with said plurality of account opening data sources, said local entity computer data source and said at least one database, and including:
   a data acquisition layer, acquiring the account opening data from said plurality of account opening data sources including the at least one component of the account opening system and the local entity computer data source at a first predetermined frequency, and transmitting the account opening data at a second predetermined frequency;
   a data processing layer processing the account opening data, said processing comprising receiving the account opening data from said data acquisition layer, extracting amount values responsive to the account opening data representing performance metrics associated with the account opening system received from said plurality of account opening data sources to at least one interface file, generating at least one table using input from the at least one interface file, and saving the at least one table in said database; and
   an information delivery layer generating and delivering a plurality of account opening reports representing the metrics collection and analysis responsive to at least one of the at least one interface file and the at least one table.

2. The computer system architecture of claim 1, wherein said data acquisition layer acquires the account opening data via predetermined data feeds, wherein said data processing layer processes the account opening data from said predetermined data feeds, and wherein said information delivery layer generates the account opening reports responsive to the processed account opening data, and generates a predetermined view and performance analysis of the account opening process, customer and staff interactions, and profitability of account opening processes globally.

3. The computer system architecture of claim 1, wherein said data acquisition layer acquires the account opening data from the at least one component of an account opening system including logs of events and status changes acquired from at least one of an account opening front end, an application processing engine, a queue management system, a customer communications module, a funding system, and a product system, and wherein said data processing layer processes the account opening data including the logs of events and the status changes, and extracts the amount values to the at least one interface file and generates the at least one table responsive to the logs of events and the status changes.

4. The computer system architecture of claim 3, wherein said data acquisition layer acquires front end logs of management information events and application data from each front end application.

5. The computer system architecture of claim 3, wherein said data acquisition layer acquires front end logs of exit and re-entry events for front end screens supporting local exit points from each front end application.

6. The computer system architecture of claim 3, wherein said data acquisition layer acquires front end data used to identify which configuration options are offered to the user, application processing engine data used to identify the configuration options selected by the user, and wherein the front end data and the application processing engine data are available at an applicant level and a product level.

7. The computer system architecture of claim 3, wherein said data acquisition layer acquires front end logs comprising at least one of a Configuration ID, a Process ID, a Flow ID, and a Tracking ID.

8. The computer system architecture of claim 3, wherein said data acquisition layer acquires front end logs of events comprising at least one of: terms and conditions displayed to the user on a terms and conditions screen, user accepts or declines the terms and conditions on a terms and conditions decision screen and exits the terms and conditions decision screen, product offer displayed to the user on a product offer screen, and user accepts or declines the offer on an offer decision screen and exits the offer decision screen.

9. The computer system architecture of claim 3, wherein said data acquisition layer acquires front end logs including time difference between rendering of a screen until the user selects to continue from the screen.

10. The computer system architecture of claim 3, wherein said data acquisition layer acquires from the queue management system an extraction of data on the queues.

11. The computer system architecture of claim 10, wherein said queue management system generates and delivers at least one operation report comprising at least one of an activity report, an hourly queue volume report, and a location/unit activity report.

12. The computer system architecture of claim 3, wherein said data acquisition layer acquires from the application processing engine an extraction of data on at least one of applications, product applications, applicants funding, to-do's, and event-based transactions.

13. The computer system architecture of claim 3, wherein said data acquisition layer acquires from the customer communications module an extraction of communications data.

14. The computer system architecture of claim 3, wherein said data acquisition layer acquires from the product system comprising a cards system at least one of a credit card account balance, a Referrer ID, a Voucher code, and a Tracking ID.

15. The computer system architecture of claim 3, wherein said data acquisition layer acquires from the product system comprising a core banking system account details, including at least one of line of business, voucher code, and referrer details.

16. The computer system architecture of claim 3, wherein said data acquisition layer acquires the account opening data responsive to a business process identifier tracked by the application processing engine and a flow identifier tracked by the account opening front end used to determine a sequence of processes for an end-to-end account opening journey.

17. The computer system architecture of claim 16, wherein each account opening journey has a channel attribute having at least one variable, and wherein said data acquisition layer is configured to, when the at least one variable changes to a new variable, acquire the logs of events and status changes responsive to the new variable, without IT intervention.

18. The computer system architecture of claim 1, wherein said data acquisition layer acquires the account opening data from the local entity including at least one of media agency data, promotion data, and operating plan data.

19. The computer system architecture of claim 1, wherein said data acquisition layer acquires the account opening data from the plurality of account opening data sources including at least one web analytics provider.

20. The computer system architecture of claim 1, wherein said data acquisition layer transmits the account opening data to a data interface layer comprising at least one of a channel events interface, an accounts interface, a customer interface, a products interface, a transactions interface, and a staff data interface.

21. The computer system architecture of claim 1, wherein the plurality of reports comprises at least one of a dashboard report, a daily report, a daily tracking report, a sales application funnel report, an application journey report, a media funnel report, a staff funnel report, a product application decisions:approval ratio report, a product applications age at status report, a configuration options report, and a communications efficiency report.

22. A computer implemented method for collecting and analyzing metrics, comprising:
    acquiring, by at least one computer, account opening data from a plurality of account opening data sources including at least one component of an account opening system and a local entity computer data source storing account opening data;
    extracting, by the at least one computer, amount values from the account opening data representing performance metrics associated with the account opening system received from said plurality of account opening data sources to at least one interface file, generating, by the at least one computer, at least one table using input from the at least one interface file, and saving, by the at least one computer, the at least one table in at least one database storing metrics data associated with the account opening system; and
    generating and delivering, by the at least one computer, a plurality of account opening reports representing the metrics collection and analysis responsive to said at least one table.

23. The method of claim 22, wherein said acquiring the account opening data comprises acquiring, by the at least one computer, the account opening data from the at least one component of an account opening system including logs of events and status changes acquired from at least one of an account opening front end, an application processing engine, a queue management system, a customer communications module, a funding system, and a product system.

24. The method of claim 23, wherein said acquiring the account opening data comprises acquiring, by the at least one computer, front end logs of management information events and application data from each front end application, wherein the front end logs comprise at least one of a Configuration ID, a Process ID, a Flow ID, and a Tracking ID.

25. The method of claim 23, wherein said acquiring the account opening data from the at least one component of the account opening system comprises acquiring, by the at least one computer, from the queue management system an extraction of data on the queues; acquiring, by the at least one computer, from the application processing engine an extraction of data on at least one of applications, product applications, applicants funding, to-do's, and event-based transactions; acquiring, by the at least one computer, from the customer communications module an extraction of communications data; and acquiring, by the at least one computer, from the product system comprising a core banking system account details, including at least one of line of business, voucher code, and referrer details.

26. The method of claim 23, wherein each account opening journey has a channel attribute having at least one variable, and when the at least one variable changes to a new variable, acquiring the logs of events and status changes responsive to the new variable, without IT intervention.

27. The method of claim 22, wherein said acquiring the account opening data from the local entity comprises acquiring, by the at least one computer, at least one of media agency data, promotion data, and operating plan data.

28. The method of claim 22, wherein said acquiring the account opening data from the plurality of account opening data sources comprises acquiring, by the at least one computer, the account opening data from at least one web analytics provider.

29. The method of claim 22, wherein the plurality of reports comprises at least one of a dashboard report, a daily report, a daily tracking report, a sales application funnel report, an application journey report, a media funnel report, a staff funnel report, a product application decisions:approval ratio report, a product applications age at status report, a configuration options report, and a communications efficiency report.

* * * * *